United States Patent [19]

Ide

[11] Patent Number: 4,496,251
[45] Date of Patent: Jan. 29, 1985

[54] PAD-TYPE HYDRODYNAMIC BEARING

[76] Inventor: Russell D. Ide, P.O. Box 744, Coventry, R.I. 02816

[21] Appl. No.: 610,140

[22] Filed: May 14, 1984

[51] Int. Cl.³ ............................................. F16C 32/06
[52] U.S. Cl. .................................. 384/117; 384/122; 384/124
[58] Field of Search .............. 384/117, 122, 124, 306, 384/308, 309, 119

[56]  References Cited
U.S. PATENT DOCUMENTS

| | | | |
|---|---|---|---|
| 3,791,703 | 2/1974 | Ifield | 384/117 |
| 3,930,691 | 1/1976 | Greene | 384/307 |
| 3,944,304 | 3/1976 | Purtschert | 384/117 |
| 4,403,873 | 9/1983 | Gardner | 384/122 |

Primary Examiner—Lenard A. Footland
Attorney, Agent, or Firm—Barlow & Barlow

[57] ABSTRACT

A pad-type sliding surface bearing is disclosed, in which the bearing surface is segmented into a plurality of pads that rockingly displace themselves to form a wedge shape converging in the direction of motion with a relatively moving part. The pads are each supported in a bearing housing or a support portion by a plurality of webs which indeed are integral with the pad and the housing or support portion, which allow the pad to rock by deflection of the webs. The opposing part that moves relative to the pads creates a viscous friction force in the direction to form a converging web shape between the moving part and the bearing pad, which rocks to a position until the bearing surface stabilizes where the moments of the fluid pressure and the load are in balance.

6 Claims, 5 Drawing Figures

PAD-TYPE HYDRODYNAMIC BEARING

BACKGROUND OF THE INVENTION

Hydrodynamic bearings that are also sometimes known as swing pad bearings, are mounted in such a way that they can move to permit the formation of a wedge-shaped film of lubricant between the relatively moving parts. Essentially the pad displaces through a swing-type motion about a center located in front of the pad surface, and bearing friction tends to open the wedge. In the Hall patent, U.S. Pat. No. 2,137,487, there is shown a hydrodynamic moveable pad bearing that develops its hydrodynamic wedge by sliding of its pad along spherical surfaces. In many cases the pad sticks and the corresponding wedge cannot be developed. In addition, in the Greene patent, U.S. Pat. No. 3,930,691, an elastomeric support is seen for a bearing pad to allow the pad to move. In this structure, however, the use of the bearing is limited by temperature capability and chemical resistance of the elastomer support.

SUMMARY OF THE INVENTION

The present invention relates to a bearing in which the pad is spaced from the support member by webs or flexible ligaments. The ligments are arranged in an arcuate pattern such that under friction and pressure forces, the pad moves to form the lubricating wedge. Movement of the pad is provided by the bending action of the webs' ligaments and is directly proportional to applied load without any stick slip associated with a sliding movement.

One of the primary objects of the present invention is to provide a bearing which will eliminate the need for any lubrication between the pad or face member and the support member, and to provide a bearing which will not only have bi-directional operation, but will also be operational in a high temperature or a corrosive chemical environment.

DETAILED DESCRIPTION OF THE PREFERRED EMBODIMENTS

Figure 2:
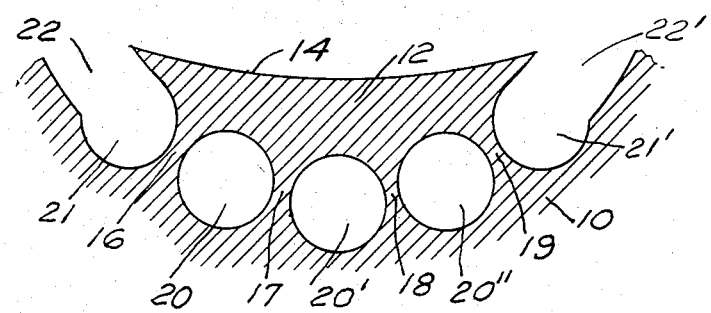
FIG. 2 is an enlarged view of a single pad made in accordance with the invention.

Referring first to FIG. 2, the structure illustrated by way of example comprises a bearing housing 10 and a bearing pad 12. As is usual in the art, the bearing pad which is intended to be used in a journal bearing, has an arcuate face 14 which will correspond essentially to a radius which is approximately equal to the radius of the shaft which the pad will be supporting. The pad is joined to the base or support portion 10 by a plurality of webs or ligaments designated 16, 17, 18 and 19, and each of these webs or ligaments will be more readily formed by taking the journal, for example, and drilling a plurality of holes, such as 20, 20', 20", and finishing off with drilling holes such as 21, 21', which will then be milled out as at 22, 22', leaving only, as in the illustrated case, four webs or ligaments supporting the pad 12. By way of example, when forming a number of pads in this fashion, let us assume that the pad has a dimension thereacross of approximately one inch (25.4 mm), and in this case each of the webs or ligaments 16, 17, 18 and 19 would have a dimension at their thinnest points of 0.01 (0.254 mm) to 0.03 inch (0.762 mm), depending on load and lubricant viscosity.

Figure 1:
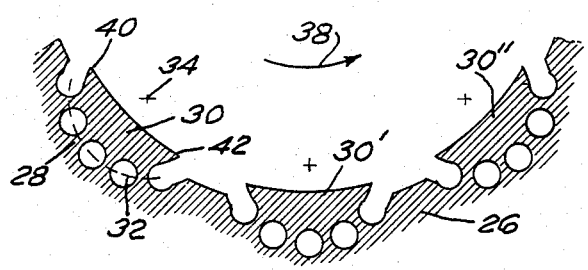
FIG. 1 is a sectional view of a journal bearing showing only a portion thereof.

In FIG. 1 there is illustrated a portion of a journal utilizing the constructional technique briefly described above in connection with a single pad of FIG. 2, and will consist essentially of a casing 26 which has joined thereto, by a plurality of webs or ligaments such as, for example, ligament 28, a plurality of pads 30, 30', 30". It should be noted that if one considers the center of each of the bored-out portions, which can be represented by a broken line 32, that the radius of this line 32 will be at, for example, point 34 which lies toward the central axis of the journal and above the face of the bearing pad. If in this journal form of bearing we assume that there is motion as seen by the arrow 38, the friction forces which are developed will tend to rock the pads so that their leading edge such as 40 will move radially outward while the trailing edge 42, for example, will move radially inward to develop a wedge of fluid between the journal and pad. The movement is minute but is sufficient to create the wedge necessary.

Figure 3:
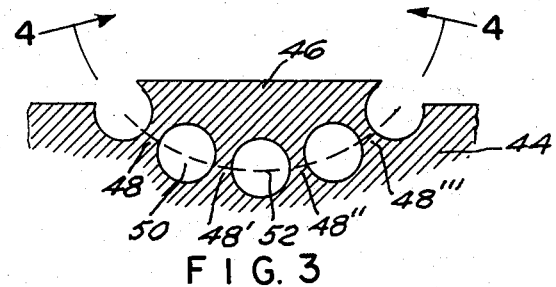
FIG. 3 is a sectional view of a thrust form of bearing made in accordance with the invention.

Referring to FIG. 3, there is illustrated a bearing pad made in accordance with this invention, which will essentially have a support portion 44 which is joined to a pad 46 by a plurality of webs or ligaments 48, 48', 48", 48'''. These ligaments may be formed by making the pad and the base support as an integral unit and drilling holes such as a hole 50 in a spaced relationship and on a desired arc such as shown by broken line 52, which arc will have a center as at 54 ahead of the face of the pad 46.

Figure 4:
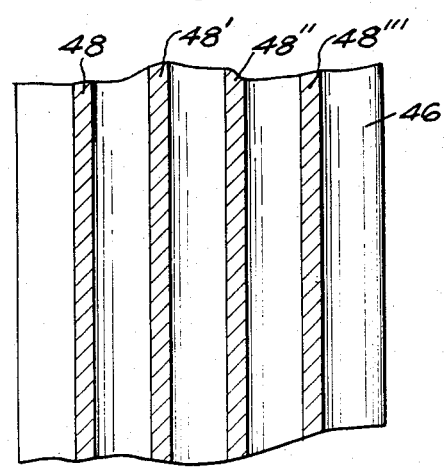
FIG. 4 is a sectional view taken on lines 4—4 of FIG. 3.

FIG. 4 which is a sectional view assists in bringing out the structure shown and illustrates the relative dimension of the ligaments such as 48 to the voids formed by the bored apertures.

Figure 5:
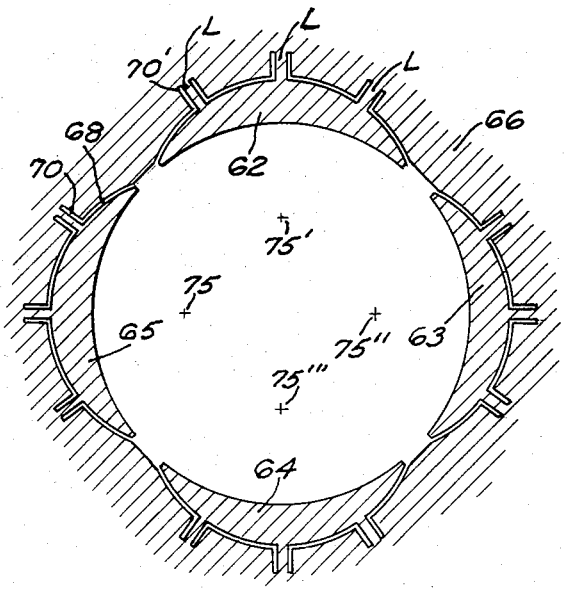
FIG. 5 is a sectional view of a journal bearing illustrating an alternate form of creating a pad.

Referring to FIG. 5, a slightly changed version or modification of the invention has been illustrated utilizing a journal as an example. Here we have a plurality of pads 62, 63, 64 and 65, together with their housing 66 for a journal (not shown). In this particular form the pads are constructed by using electrical discharge machining, which will cut along through the housing parallel to the axis of the bearing housing, a cut 68, for example, which is formed on a pair of arcs and protrudes radially outward into the body of the journal housing with a pair of legs such as 70, 70'. This arrangement is repeated going around the journal housing with radially outward and radiused cuts to form the pads and also a plurality of ligaments which for simplicity's sake have been designated L in the drawing. These ligaments which utilize the previously given parameters for a pad which has a face of one-inch width, will have a thickness on the order of 0.01 to 0.03 inch and will support the pad and yet allow flexing thereof. It should also be noted that the electrical discharge machining cuts, such as 68, are formed when they are in the arcuate phase to be on a radius line having a center as at 75, 75', 75", 75''', which as will be seen, lies radially inward from the face of the pads.

I claim:

1. A hydrodynamic bearing supporting an opposing moving part, a plurality of bearing pads, each pad having a face member and a support member, said pad being separated from said support member and by a plurality of web-like ligaments, the face of said pad having a load-engaging surface, said pad under the action of friction on the face thereof rocking to cause the trailing edge to approach the member being supported in bearing relationship.

2. A hydrodynamic bearing as in claim 1 wherein said ligaments are disposed beneath the pad in a arc.

3. A hydrodynamic bearing as in claim 2 wherein the center of radius of said arc is in fron of the face of the pad.

4. A hydrodynamic bearing as in claim 1 wherein the ligaments are of uniform cross section.

5. A hydrodynamic bearing as in claim 1 wherein the ligaments have a thin center section.

6. A hydrodynamic bearing as in claim 1 wherein the pads are arranged in an arc to form a journal bearing and the pad faces are arcuate.

* * * * *